United States Patent [19]
Hunt

[11] 3,813,877
[45] June 4, 1974

[54] INTERNAL COMBUSTION ENGINE CONTROLS FOR REDUCED EXHAUST CONTAMINANTS
[75] Inventor: Duane A. Hunt, East Lansing, Mich.
[73] Assignee: Donnell R. Matthews, Jr., East Lansing, Mich.
[22] Filed: Aug. 17, 1972
[21] Appl. No.: 281,465

[52] U.S. Cl.............. 60/284, 60/285, 123/117 A, 123/119 F
[51] Int. Cl............................................ F02b 75/10
[58] Field of Search ............ 60/274, 284, 285, 292, 60/286; 123/117 A, 119 F, 119 R, 117 R

[56] References Cited
UNITED STATES PATENTS
| | | | |
|---|---|---|---|
| 1,392,141 | 9/1921 | Giesler | 123/119 F |
| 1,973,162 | 9/1934 | Briggs | 123/119 F |
| 2,184,789 | 12/1939 | Arthur | 123/117 A |
| 2,721,890 | 10/1955 | Malick | 123/117 R |
| 2,937,490 | 5/1960 | Calvert | 60/285 |
| 3,086,353 | 4/1963 | Ridgway | 60/285 |
| 3,154,060 | 10/1964 | Hundere | 123/119 R |
| 3,203,168 | 8/1965 | Thomas | 60/286 |
| 3,301,242 | 1/1967 | Candelise | 123/117 A |
| 3,447,518 | 6/1969 | Walker | 123/119 F |
| 3,662,540 | 5/1972 | Murphey | 60/274 |
| 3,696,618 | 10/1972 | Boyd | 60/285 |

Primary Examiner—Douglas Hart
Attorney, Agent, or Firm—Whittemore, Hulbert & Belknap

[57] ABSTRACT

Engine operating system for association with catalytic exhaust converters operable to provide proper timing and/or fuel mixture for engine ignition, a brief warm-up period as controlled by temperature at or adjacent the converter, and thereafter a normal timing range and fuel mixture during further operation.

18 Claims, 3 Drawing Figures

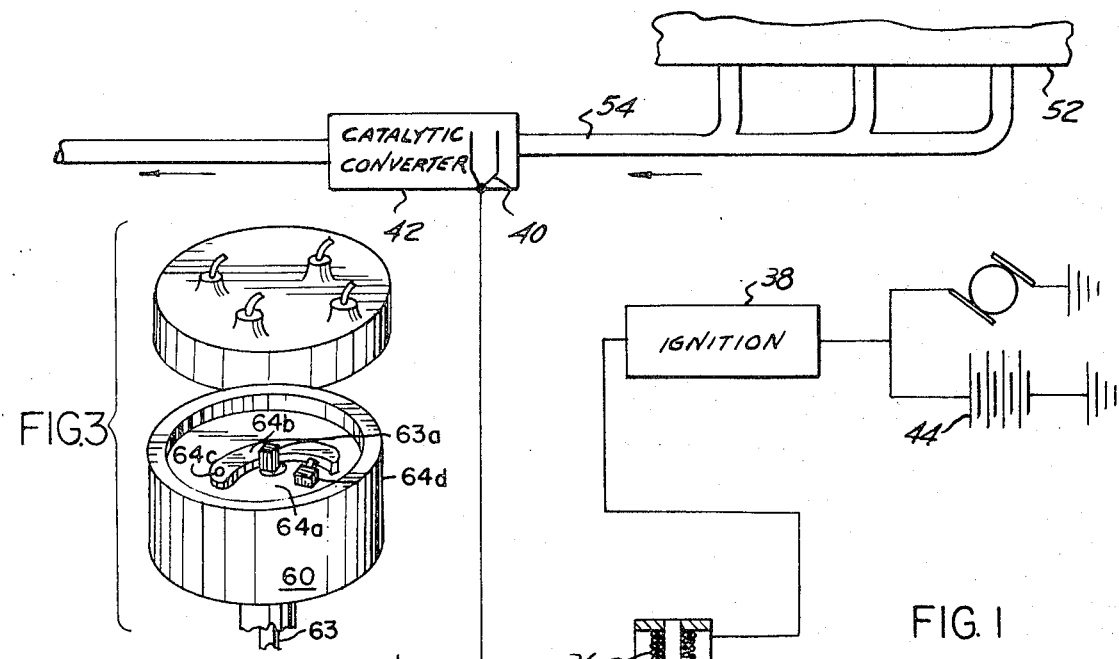
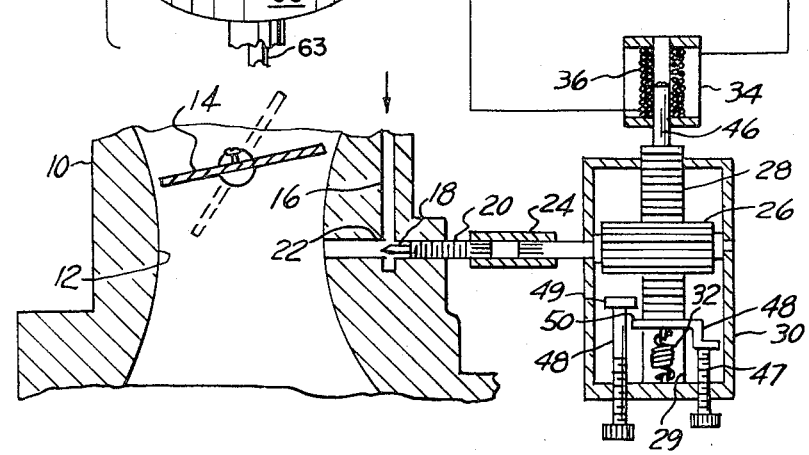
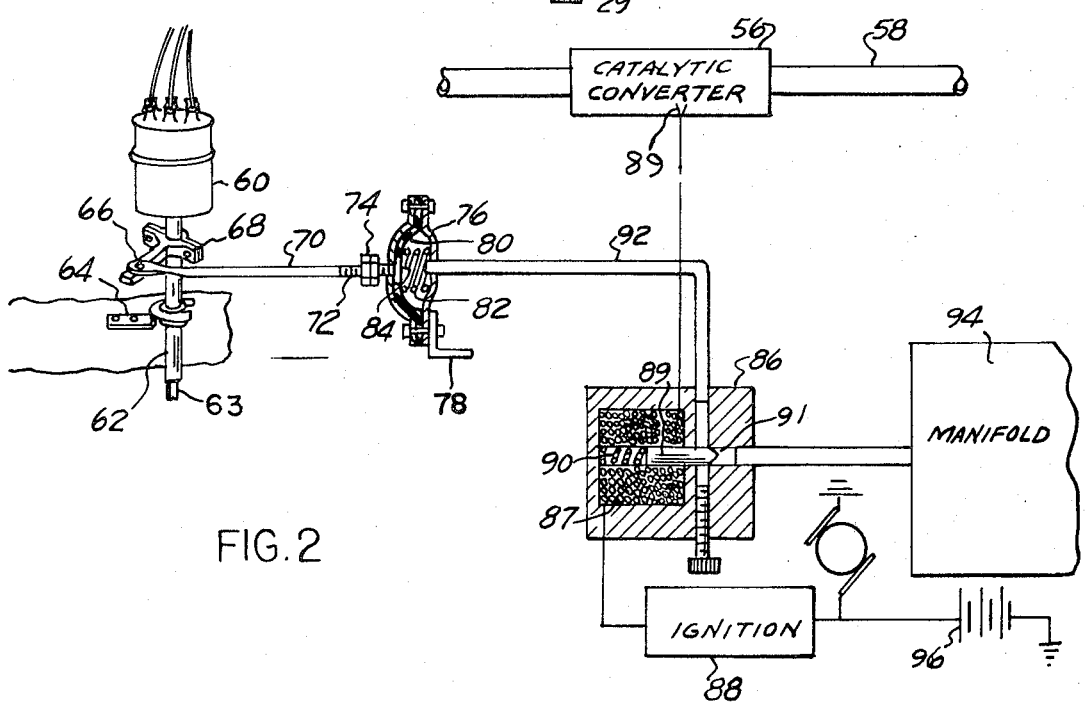
FIG. 1
FIG. 3
FIG. 2

INTERNAL COMBUSTION ENGINE CONTROLS FOR REDUCED EXHAUST CONTAMINANTS

BRIEF SUMMARY OF THE INVENTION

The present invention is related to inventions disclosed in my prior applications. Ser. No. 252,311 filed May 10, 1972 for "Distributor Adjusting Mechanism", and Ser. No. 255,761 filed May 22, 1972 for "Fuel Mixture Control".

It has been found that where catalytic converters are employed in conjunction with engine exhaust emission control, it is desirable to bring these converters to a predetermined minimum temperature as quickly as possible so as to bring about efficient catalytic conversion. However, it is imperative that the engine regulation be such as to prevent overheating of the catalytic converters which will reduce their efficiency or destroy them.

Two factors are normally controlled in accordance with the present invention to produce proper ignition, followed by quick heating, which in turn is followed when a predetermined minimum exhaust temperature at the converters is reached, by normal operation under conditions which prevent overheating.

The first of these factors is timing which is in the normal running position for starting but which is retarded upon engine ignition. The retarded spark increases heating with the effect that the exhaust gases bring the catalytic converters to efficient operating temperature in a minimum time. As soon as the temperature at the catalytic converters reaches a predetermined minimum, the spark is advanced to within its normal operating range where it is subject to the usual changes conventionally provided in accordance with changes in engine speed and manifold vacuum.

The result of this is that the engine starts under normal conditions conducive to quick and efficient engine starting and operates under normal conditions after the catalytic converter has been brought to predetermined minimum temperature. However, during a brief warm-up period which may be as low as 15 seconds, and which will normally not exceed 60 seconds, the engine operates with its spark retarded to a position which accelerates heating to bring the catalytic converters to efficient operating temperatures as quickly as possible and thus to reduce undesirable exhaust emissions during the warm-up period to as brief a time as possible.

The second factor is a fuel mixture control effected by adjustment of a fuel control needle valve in the carburetor. This needle valve has a normal operating position producing desirable efficient engine operation. However, an adjustment of the needle valve is made for a brief interval during warm-up following ignition in which the fuel-air mixture is enriched by approximately 10 percent to an air/fuel ratio of about 13:1. As soon as the temperature at the converter reaches a predetermined minimum the needle valve is moved to its normal position which produces better efficiency and lower temperatures. This normal air-fuel mixture may for example be 16:1.

The normal lean mixture reduces the amount of hydrocarbons and carbon monoxide in the exhaust gases as well as the formation of ammonia. All of these compounds in large quantities shorten the life of the converters designed to eliminate or reduce the hydrocarbon and carbon monoxide compounds. A larger amount of nitrogen-oxygen compounds (NOx) is formed at the leaner setting, but it has been found that the present NOx converters will be able to handle the NOx compounds under normal operating conditions.

BRIEF DESCRIPTION OF THE DRAWING

FIG. 1 is a diagrammatic view showing the mixture control in accordance with the present invention.

FIG. 2 is a diagrammatic view showing the timing adjustment in accordance with the present invention.

FIG. 3 is an enlarged perspective view of the distributor as shown in FIG. 2.

DETAILED DESCRIPTION

Referring first to FIG. 1 there is shown a portion of a carburetor 10 including a venturi 12, a valve 14, and fuel inlet passage 16. Associated with the fuel inlet passage 16 is a needle valve 18 carried at the forward end of a threaded element 20 longitudinally adjustable upon rotation relative to the valve seat 22 formed by the intersection of the two branches of the fuel inlet passage.

Connected to the needle valve 18 by a coupling sleeve 24 is a pinion 26 in mesh with a rack 28 slidably longitudinally in ways 29 provided in a housing 30. The rack 28 is normally retained in the illustrated position by a tension spring 32. This is the operating position which the needle valve occupies during normal engine operation after termination of the brief warm-up period.

Associated with the rack 28 is a solenoid indicated more or less diagrammatically at 34. The winding 36 of the solenoid is connected between a switch 38 connected to usual ignition system and a normally closed thermally responsive switch 40 located at or adjacent the catalytic conversion equipment 42. The switch 40 is closed when cold and when the ignition switch 38 is closed a circuit is completed from the battery 44 through the windings 36 to draw the plunger 46 of the solenoid into the winding, thus raising the rack 28 as viewed in FIG. 1. This will withdraw the needle valve 18, thus increasing the richness of the mixture.

As a result of the increased richness of the mixture, the time required for the catalytic converter 42 to reach efficient operating temperature is materially reduced and therefore, the total amount of atmospheric contaminants emitted by the engine before the catalytic converter comes up to operating temperature is correspondingly reduced.

When the thermally responsive switch 40 reaches a predetermined temperature corresponding to minimum efficient operating temperature of the converter, the switch opens and the circuit through the solenoid winding 36 is broken. At this time the spring 32 moves the rack 28 downwardly as viewed in FIG. 1 until the bottom of the rack engages a stop or abutment and the needle valve is returned to the predetermined position required for normal operation.

The position of the needle valve 18 when the rack is in the position shown may be determined by relative rotation between the pinion 26 and the threaded portion 20 of the needle valve while the sleeve 24 is disconnected from one or the other.

Preferably however, means are provided for adjusting the quality of the mixture when the valve 18 is in its limiting position. This means is diagrammatically illustrated as an abutment screw 47 engaging a stop 48 on the lower end of rack 28, and an abutment screw 48 having a head 48 engageable with lug 50 extending laterally from the lower end of rack 28 upon upward movement of the rack.

In this Figure a portion of the engine is illustrated at 52 and the exhaust pipe connecting to the catalytic converter is indicated at 54.

As soon as the catalytic converter reaches proper operating temperature, the mechanism described in the foregoing will automatically reduce the richness of the mixture to the value selected as desirable for continued operation. The leaning out of the mixture will reduce the hydrocarbons, carbon monoxide, and ammonia. Leaning the mixture increases nitrogen-oxygen cmpounds but available catalytic converters are capable of handling the nitrogen-oxygen compound emission.

The leaning out of the mixture is selected such as to increase fuel economy and the reduction in hydrocarbons and carbon monoxide extends the life of the HC-CO converter to permit it to have a life span compatible with the presently projected standards for 1975-1976 of 50,000 miles. The increase in NOx compounds resulting from a leaner mixture is acceptable since presently available NOx catalytic converters are capable of handling the extra burden.

It will be noted that if the engine stalls or if for any other reason an attempt is made to start the engine while the catalytic converter remains hot, re-ignition of the engine will not initiate a new heating cycle since the thermal switch 40 will remain in open condition until the catalytic converter has cooled down.

Referring now to FIG. 2 there is illustrated the mechanism for effecting controlled spark advance setting so as to accelerate heating of the catalytic converter system to its minimum efficient operating temperature.

In general, the purpose of this mechanism is to temporarily retard timing of the spark after ignition during the period of warm-up required by the catalytic converters, and then to return the timing to a predetermined more advanced setting for operation in a range which will result in better driveability and fuel economy. In FIG. 2 the catalytic converter is indicated at 56 and is of course located in the exhaust system indicated at 58. The distributor, is indicated at 60 and may be entirely conventional, and is supported on the vertical shaft housing 62 which contains the cam shaft 63 driven from the engine at a speed determined by engine speed. The shaft housing 62 is rotatably mounted in a support 64 which holds the shaft housing and distributor in a fixed position but permits rotation thereof as a unit by mechanism which will now be described.

Secured to the shaft housing is an operating arm 66 which is secured to the rotatable shaft housing 62 in a predetermined position by clamp means such for example as screws indicated at 68. Connected to the arm 66 is link 70 having a threaded portion indicated at 72 carrying adjustable abutment means in the form of nuts 74. A diaphragm cup 76 is mounted in fixed position by suitable means such as a bracket 78 and contains a flexible diaphragm 80 urged to the left by a compression spring 82 as seen in the Figure. The inner end of the link 70 is suitably connected to the central portion of the flexible diaphragm 80 as indicated at 84. In the position illustrated the spring 82 is holding the diaphragm in its extreme position to the left corresponding to the normal or usual spark adjustment as determined by conventional controls responsive to speed and manifold vacuum, and the abutment nuts 74 are spaced from the diaphragm cup 76 as illustrated in the Figure.

A solenoid actuated valve 86 is provided having a winding 87 connected intermediate a switch 88, connected to the usual ignition system and a thermally responsive switch diagrammatically indicated at 87' in or adjacent to the catalytic converter 56. The valve 86 includes a solenoid plunger 89 biased to the right as seen in FIG. 2 by a compression spring 90 and having an inner end 91 adapted to close the valve when the winding 87 is deenergized. The interior of the diaphragm cup 76 is connected by a conduit 92 through the valve 86 to the manifold 94. Manifold vacuum during starting while the starter is cranking the engine, may be approximately 3 to 5 pounds. Under normal idling conditions or normal cruising conditions, manifold vacuum will be approximately 20 pounds. Under normal acceleration it may drop to approximately 15 pounds. Under extremely heavy acceleration, with the throttle wide open, the vacuum may drop to a range of from 0 to 5 pounds.

The vacuum operated diaphragm 80 and spring 82 are designed so that the link or rod 70 will be drawn to the right by manifold vacuum, when the valve is open, and when the manifold vacuum is at a value of approximately 7 to 10 pounds. This range is high enough not to be disturbed by the low vacuum obtained by the starter in cranking the engine, but is also low enough not to be disturbed by small fluctuations in manifold vacuum, once the engine is started, except those resulting from extremely heavy acceleration.

With the foregoing arrangement it will be observed that when the ignition switch is closed a circuit is completed from the battery 96 through the winding 87 and the normally closed switch at the catalytic converters, to ground. This will draw the plunger 89 of the solenoid to the left, thus opening the passage in the valve and providing a passage between the manifold and the diaphragm cup 76. At this time, due to closure of the ignition switch, the engine is turned over slowly but until it actually starts, the manifold vacuum will be insufficient to draw the diaphragm 80 to the right and accordingly, the arm 66 will maintain the distributor in the position which it normally occupies during starting and running. However, as soon as the engine starts the increased manifold vacuum will quickly draw the diaphragm 80 to the right, thus swinging the arm 66 to the right to a warm-up, spark advanced position determined by the setting of the abutment nuts 74. As a result of the spark advance, the temperature of the catalytic converter will more quickly be raised to its minimum efficient operating temperature. At this temperature the temperature responsive switch 89' therein will open, interrupting the circuit through the solenoid winding 87 and permitting the spring 90 to advance the valve 91 to closed position, thus in turn permitting the spring 82 to move the diaphragm 80, the link 70, and the distributor operating arm 66 to the desired position for subsequent normal running.

It is to be understood that the foregoing adjustment of distributor adjusts the entire distributor and all associated mechanism to a spark advance position which does not affect the usual timing adjustments responsive to engine speed and manifold vacuum. In other words, the adjustment accomplished by the diaphragm 80 is an over-riding or superimposed adjustment which retards the spark with respect to the adjustments affected by the conventional spark adjustment devices.

As best seen in FIG. 3, the timing cam shaft 63 terminates at its upper end in a timing cam 63a. A plate 64a is angularly adjustable about the axis of the shaft 63 and cam 63a, and, conventionally, this plate is angularly adjustable by means responsive to manifold vacuum such for example as shown in Kind et al. U.S. Pat. No. 3,237,619. Mounted on the plate 64a is a lever 64b spring urged toward the cam 63a about a pivot determined by a mounting post 64c. At the free end of the lever 63b there is an electrical contact which makes and breaks contact with a second contact carried by a post 64d mounted in fixed position on the plate 64a. By rotating the housing of the distributor 60, the entire structure including the plate 64a, together with the arm or lever 64b, is rotated about the axis of the timing cam 63a. Thus, adjustment of the housing as disclosed herein provides a predetermined adjustment of the spark timing which is superimposed on the timing as determined by angular adjustment of the plate 64a relative to the housing and, as is usual, by adjustment of the cam 63a relative to the cam shaft 63 in response to variations in engine speed.

The present timing adjustment is particularly useful in conjunction with emergency vehicles which often are required to start up and attain high speed on emergency runs. In this case the system will operate as previously described except that under heavy acceleration, the manifold vacuum will drop to a value allowing the timing to return to its normal position for proper and necessary acceleration and driveability. Until the converter is warmed up, the timing will be retarded only during idle operation, cruising or slowing down. In any case, the total time of operation while the spark is retarded will be rather short. Under extreme acceleration the exhaust temperature rises rapidly even if the timing is operated in a more advanced state than contemplated herein for a warm-up period.

Retarding the spark during normal warm-up conditions allows for faster, hotter warm-up during cold start to shorten the time required for heating the catalytic converters to efficient operating condition. At the same time, the arrangement does not interfere with efficient starting because the actual engine ignition occurs with the usual setting, not the advanced setting which occurs only after engine ignition.

After the converters have been brought to the required temperature the timing is returned to its normal position to avoid destruction of the converters due to excessive heat as well as to give better engine performance and driveability, less heat, and when accelerating from a stopped position, smoother running of the engine, and more efficient operation including increased RPM for the same amount of gas.

This in turn adds to fuel economy and reduces the hazard of overheating when under a load such as pulling a trailer, climbing a long steep grade, or simply with accessories such as air conditioning.

The present invention as it relates to the distributor is adaptable to all distributors since it amounts only to effecting an adjustment of the complete distributor housing relative to the rotating cam shaft without affecting the usual speed and vacuum responsive adjustments thereof.

In the event that the engine stalls while still cold, the distributor automatically resets itself on restarting. When the catalytic converters are warm, restarting of the car does not require warm-up time and no timing adjustment occurs since the thermally actuated switch has stayed open.

The present invention is concerned with decreasing the time required for catalytic exhaust converters to reach efficient operating temperature. As described herein, this is accomplished by retarding the spark and enriching the mixture during the period required for bringing the converters to operating temperature. While it is desirable to employ both the spark adjustment and the mixture adjustment for most efficient results, it will of course be apparent that the described control of either the timing or the fuel mixture will be useful alone.

It may be mentioned that numerous types and styles of catalytic converters are available. A common factor among them is that a special pre-warm-up is required to bring them up to the 1975–1976 anti-pollution standards. The required minimum temperature for the catalytic converters at present available ranges from 300° F. to 1,000° F., dependent upon the materials being used and the physical characteristics of the converters. The converters also have a maximum operating temperature which must not be exceeded in order to avoid burning up the catalyst or other materials in the converters.

It has been found desirable to have a 10 percent rich air/fuel mixture, (13:1) along with a retarded spark to meet a 60-second warm-up requirement. However, if this rich fuel mixture and retarded spark are maintained after warm-up, the converters will have a shorter life span because of high temperatures which will be attained.

A lean air/fuel mixture (16:1) produces better fuel efficiency and lower temperatures. The necessary warm-up however, cannot be achieved at this setting. The lean mixture also reduces the amount of hydrocarbons and carbon monoxide contaminants, as well as ammonia. These compounds in large quantities will shorten the life of the converters designed for their elimination or reduction of contaminants. A somewhat larger amount of nitrogen-oxygen compounds is formed at the leaner setting, but chemical converters for nitrogen-oxygen compounds are able to handle the extra load.

While FIGS. 1 and 2 illustrate separate thermally responsive means at the conversion equipment, it will be understood that normally open switch 40 and switch 38 may control both solenoid windings 36 and 87.

What I claim as my invention is:

1. An engine control system for an internal combustion engine having a source of electrical energy, an ignition switch, and having in its exhaust system catalytic conversion equipment, said system comprising means operable automatically upon closing the ignition switch to start the engine to enrich the fuel/air mixture by a predetermined amount above the normal value for continued operation and means responsive only to temperature of the catalytic conversion system to restore the fuel/air mixture to such normal value upon attainment of a predetermined minimum temperature of the conversion system, said means comprising a needle valve controlling flow of fuel to the engine, a solenoid operatively connected to the needle valve, a thermally responsive switch at said conversion equipment closed when said conversion equipment is below efficient operating temperature, said solenoid and said thermally responsive switch being connected in series with the engine ignition switch and source of electrical energy, said needle valve being threadedly adjustable, and the operative connection between the solenoid and needle valve comprising a rack connected to the solenoid, a pinion in mesh with the rack, and adjustable means connecting said pinion to said needle valve.

2. A system as defined in claim 2 in which said means is effective to enrich the mixture by about 10 percent during the period required to bring the conversion equipment to operating temperature.

3. A system as defined in claim 1 in which the adjustable means comprises a coupling sleeve for adjusting the position of the needle valve relative to said pinion.

4. An engine control system for an internal combustion engine having a source of electrical energy, an ignition switch, and having in its exhaust system catalytic conversion equipment, said system comprising means operable automatically upon closing the ignition switch to start the engine to enrich the fuel/air mixture by a predetermined amount above the normal value for continued operation and means responsive only to temperature of the catalytic conversion system to restore the fuel/air mixture to such normal value upon attainment of a predetermined minimum temperature of the conversion system, comprising an adjustable spark distributor, and comprising additional means controlled by said ignition switch and operable automatically upon ignition of the engine while cold to adjust the distributor to retard the spark by a predetermined amount from the normal spark operating range and responsive solely to temperature of the catalytic conversion equipment to advance the spark to its normal operating range upon attainment of a predetermined minimum temperature of the conversion system.

5. A system as defined in claim 4 in which said additional means comprises motor means connected to the distributor, and means connected to said motor means and responsive to a value of manifold vacuum attained only upon engine ignition after cranking to retard the spark from its normal operating range.

6. A system as defined in claim 5 in which the said motor means is vacuum actuated, and the means connected to said motor means comprises a duct connected to engine manifold vacuum and including a solenoid actuated by closure of said ignition switch, a control valve for said motor means operatively connected to said solenoid, said means responsive to temperature of the conversion equipment comprising a thermally responsive switch, said thermally responsive switch and ignition switch being connected in series with said solenoid and said source of electrical energy.

7. An engine modification control system for addition to a conventional engine having a fuel and air supply system, an ignition system including an adjustable spark distributor responsive to engine speed and manifold vacuum, and an exhaust system including a catalytic converter, said modification system comprising enrichment means operable upon ignition of the engine while said converter is cold to superimpose a predetermined amount of fuel enrichment on the fuel-air mixture as controlled by the fuel and air supply system, means responsive solely to temperature at said converter to terminate said enrichment when said converter reaches minimum efficient operating temperature, the fuel and air supply system being provided with a threadedly adjustable needle valve in the fuel supply to regulate fuel flow relative to air flow, and said enrichment means comprises a solenoid, a rack connected to said solenoid, a pinion in mesh with said rack, said pinion being operatively connected to said needle valve, a circuit for said solenoid including a normally closed thermally responsive switch at said converter operable to open when said converter reaches minimum efficient operating temperature, said solenoid when energized being operable to move said needle valve a predetermined amount toward open position.

8. A system as defined in claim 7 in which said enrichment means is effective to enrich the mixture by about 10 percent during the period required to bring the converter to operating temperature.

9. A system as defined in claim 7 comprising adjustable abutment means for limiting movement of said rack.

10. A system as defined in claim 7 comprising means for adjusting the position of the needle valve relative to said pinion.

11. An engine modification control system for addition to a conventional engine having a fuel and air supply system, an ignition system including an adjustable spark distributor responsive to engine speed and manifold vacuum, and an exhaust system including a catalytic converter, said modification system comprising enrichment means operable upon ignition of the engine while said converter is cold to superimpose a predetermined amount of fuel enrichment on the fuel-air mixture as controlled by the fuel and air supply system, means responsive solely to temperature at said converter to terminate said enrichment when said converter reaches minimum efficient operating temperature, and additional means operable automatically upon ignition of the engine while cold to adjust the distributor to retard the spark a predetermined amount from its values within the normal spark range and to maintain the spark adjustment until the catalytic conversion system reaches efficient operating temperature and responsive solely to temperature of the catalytic conversion equipment to advance the spark to its normal operating range upon attainment of a predetermined minimum temperature of the conversion system.

12. A system as defined in claim 11 in which said additional means comprises motor means connected to the distributor, and means connected to said motor means and responsive to a value of manifold vacuum attained only upon engine ignition after cranking to retard the spark as aforesaid.

13. A system as defined in claim 12 in which the said motor means is vacuum actuated, and the means connected to said motor means comprises a duct connected to engine manifold vacuum and including a solenoid valve, said means responsive to temperature of the conversion equipment comprising a thermally responsive switch, said thermally responsive switch and ignition switch being connected in series with the solenoid of said valve and said source of electrical energy.

14. An engine modification control system for addition to a conventional engine having a fuel and air supply system, an ignition system including an adjustable spark distributor responsive to engine speed and manifold vacuum, and an exhaust system including a catalytic converter, said distributor comprising a housing, and a timing cam shaft extending into said housing, said modification system comprising means mounting said housing for angular adjustment about the axis of said shaft means operable automatically upon ignition of the engine while cold to adjust the distributor housing to superimpose a predetermined fixed amount of spark retard on the spark from its values within the normal spark range and means responsive to temperature of the catalytic conversion equipment to remove the spark retard to return the spark to its normal operating range upon attainment of a predetermined minimum temperature of the conversion system.

15. A system as defined in claim 14, said modification system comprising motor means connected to the distributor housing, means connected to said motor means and responsive to a value of manifold vacuum attained only upon engine ignition after cranking to retard the spark from its normal operating range.

16. A system as defined in claim 15 in which the said motor means is vacuum actuated, and the means connected to said motor means comprises a duct connected to engine manifold vacuum and including a solenoid actuated valve, said means responsive to temperature of the conversion equipment comprising a thermally responsive switch, said thermally responsive switch and ignition switch being connected in series with the said solenoid of said valve and said source of electrical energy.

17. A system as defined in claim 14 in which the adjustable spark distributor comprises a rotatable timing cam, and a housing carrying timing means actuated by the cam, the means operable automatically upon ignition comprises means mounting the housing as an entirety for angular adjustment relative to the cam whereby the timing adjustment is superimposed on the usual timing control inherent in the conventional spark distributor.

18. A system applicable to the engine of an automobile having a carburetor provided with a fuel control valve for controlling the richness of the fuel supply mixture to the engine through the carburetor, the engine having an engine operated timing cam and a distributor provided with a housing in which said cam is located, said housing having therein a circuit breaker arm actuated by the cam, said system being adapted to reduce the time required for a catalytic converter contained in the exhaust system of the automobile engine to reach efficient operating temperature and comprising a normally closed switch responsive directly to the temperature of the catalytic converter and adapted to open when the converter reaches efficient temperature, a first solenoid in series with said switch, means connecting said first solenoid to the fuel control valve and operable upon energization of the solenoid to effect a predetermined adjustment of said fuel control valve, means mounting said distributor housing as a unit for angular adjustment about the axis of rotation of the timing cam, pressure actuated motor means connected to said distributor housing, a passage connecting said motor means to the intake manifold of the engine, a solenoid actuated value in said passage and a second solenoid connected to said last mentioned valve and in series with said switch and operable upon energization of said second solenoid to open said solenoid actuated valve, said motor means being operable upon starting the engine to provide an over-riding adjustment of the distributor housing to retard the spark, whereby upon energization of the solenoids, initial engine operation occurs with a predetermined enrichment of fuel and with a predetermined amount of spark retard superimposed on the normal timing adjustment of the distributor which continues until the catalytic converter reaches efficient operating temperature and is then terminated.

* * * * *